Feb. 28, 1950     R. M. CRITCHFIELD ET AL     2,498,793

GENERATOR CONTROL SYSTEM

Filed Aug. 22, 1946

INVENTORS
Robert M. Critchfield and
Paul L. Schneider
BY Spencer, Hardman & Fehr
their ATTORNEYS Patented Feb. 28, 1950

2,498,793

UNITED STATES PATENT OFFICE 2,498,793

GENERATOR CONTROL SYSTEM

Robert M. Critchfield and Paul L. Schneider, Anderson, Ind., assignors to General Motors Corporation, Detroit, Mich., a corporation of Delaware Application August 22, 1946, Serial No. 692,352

1 Claim. (Cl. 290—50)

This invention relates to control means for variable ratio drive to be used with automotive generators.

The power required to operate an automotive generator varies with speed and with electrical output, the latter depending on the electrical load operating in the vehicle and the state of charge of the battery. When considering the application of an electromagnetic coupling to the generator drive so that the required drive ratio can be obtained at low engine speeds to secure adequate generator output and so that less drive ratio will be obtained at higher engine or car speeds in order to reduce stress on rotating parts and to reduce wear, particularly that of brushes and commutators, some means for controlling the slip of the coupling is necessary.

An object of the invention is to provide for the control of the slip of an electrical coupling in such manner that the required generator output will be obtained at low engine speeds while, in the higher speed range of the engine, the generator speed will not become excessive.

In the disclosed embodiment of the invention, the excitation of the energizing coil of the coupling is controlled in response to generator performance.

The excitation of the coupling coil is controlled by means responsive to generator voltage and by means responsive to generator temperature.

Further objects and advantages of the present invention will be apparent from the following description, reference being had to the accompanying drawings, wherein a preferred embodiment of the present invention is clearly shown.

Figure 1:
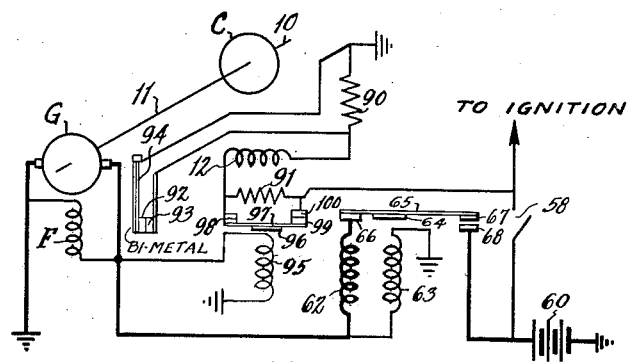
Fig. 1 is a wiring diagram of one embodiment of the invention.

In Fig. 1 the line 10 designates an engine driven shaft. The circle C designates an electromagnetic coupling for connecting the shaft 10 with shaft 11 which drives generator G. The slip of coupling C is dependent upon the current flowing through the coupling coil 12. A form of electromagnetic coupling is disclosed in Fig. 4. Shaft 10 is journaled in bearings 13 supported by a bracket 14. To shaft 10 there is connected by a key 14 a plate 16 to which screws 17 attach a magnetizable shell or rotor 18, the interior surface of which is provided with a plurality of longitudinal extending grooves 19 equi-angularly spaced and each receiving a copper strap 20. The ends of all of the straps 20 are connected with rings 21 and 22 thus providing a squirrel cage rotor construction. The shaft 10 supports a pin bearing 24 and a ball bearing 25 upon which is journaled a magnetizable shaft 26 to which screws 27 attach a plate 28 connected to or integral with generator shaft 11. A spacer 29 located within the shaft 26 and retained by the plate 28 holds the bearing 25 in position within the shaft 26. Shaft 26 provides pole pieces 30 which are diametrically opposite and which are located between diametrically opposite pole pieces 31 extending from a plate 32 supported by the shaft 26, said shaft having a shoulder 26a against which the plate 32 is forced by the tightening of a nut 33 threadedly engaging the left end of the shaft 26 there being a washer 34 between the nut and the plate 32. The coupling field coil 12 of ring formation is supported by the shaft 26 and is embraced by the pole pieces 30 and 31 each of which has an angular span of slightly less than 90°. The pole pieces 30 will have polarity opposite to the polarity of the pole pieces 31. The coil 12 is connected by wires 35 and 36 with slip rings 37 and 38 insulatingly supported upon the shaft 36 by non-conducting sleeve 39. The rings 37 and 38 are engaged respectively by brushes 41 and 42. The coupling C (Fig. 1) therefore consists chiefly of a rotor 18 and a rotating field 40 and which includes the magnetizable shaft 26, the coupling field coil 12 and pole pieces 30 and 31 alternately of opposite polarity each pole piece spanning circumferentially somewhat less than 90°. A coupling of this type is known as an electromagnetic coupling.

Figure 3:
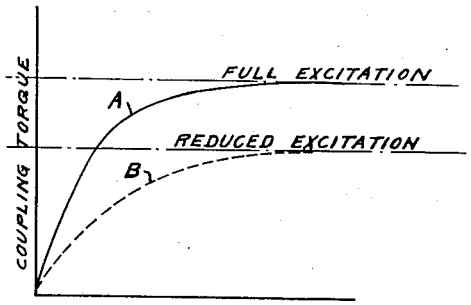
Figure 4:
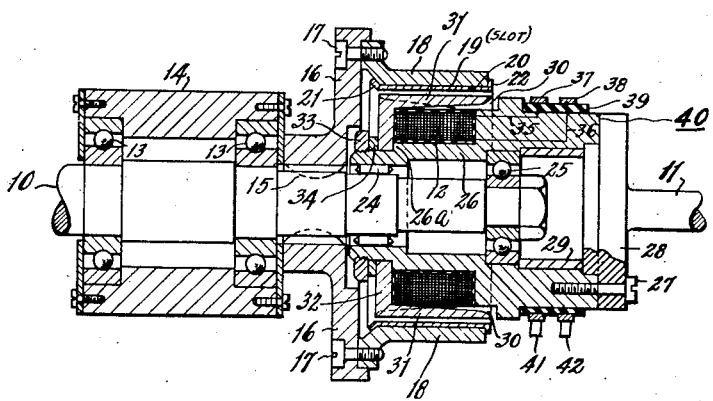
Fig. 4 is a longitudinal sectional view of a typical electro-magnetic coupling.

Fig. 3 shows a generator control system in which the torque characteristic of the coupling is used to determine the maximum speed of the generator under conditions of full output. The torque characteristics of the coupling are shown in Fig. 5 in which the curves are based on the relation of coupling torque to coupling slip. Curve A shows the characteristic for full excitation of the coupling and curve B is reduced excitation. In Fig. 4, curve O—E—C shows the relation between generator torque and generator speed. Curve O—F—G shows the relation of generator current output to generator speed. If the coupling remains fully excited generator torque will rise to value C, generator speed to value H and the output in amps. to value G. When the excitation of the coupling is reduced as represented by curve B, generator torque will be value E and speed value G and the amps. output value F. Therefore, the limiting speed of the generator will be that at which the torque required to drive the generator equals the maximum output torque of the coupling. The coupling coil 12 is controlled by resistances 90 and 91. Resistance 90 is normally by-passed by a thermal switch comprising contacts 92 and 93 and a bimetal blade 94 in heat receiving relation to the generator. When the generator temperature exceeds a certain amount, the maximum amount of the coupling and thus the maximum speed and output of the generator are reduced to a safe value. Resistance 91 is controlled by a generator voltage responsive regulator comprising a voltage coil 95 surrounding a core, not shown, cooperating with an armature 96 attached to a spring blade 97, fixed to a terminal 98, and carrying a contact 99 normally engaging a contact 100. When a certain generator voltage is exceeded contact 99 is separated from contact 100 to render the resistance effective to reduce the excitation of the coupling coil 12. This increases the coupling slip and holds the speed of the generator and its output at a value which will just maintain the voltage for which the regulator is set.

Since the functioning of the thermostat blade 94 depends on the application of heat from the generator, the opening of contacts 92, 93 is dependent upon the amount of current output and environment temperature. For a given load it will take longer in winter than in summer for the generator temperature to which the blade is subjected to rise to a value such as to cause separation of the contacts 92, 93. This is an advantage because the generator is required to supply more current for lighting and car heaters in cooler weather as well as to keep the battery charged. As battery charge increases and generator voltage increases to a value such that the regulator controlling contact 99 operates to effect reduction of the coupling torque either from the values on curve A (Fig. 5) or from the values on curve B thereby protecting the battery from excessive charging independently of operation of the thermostat 94.

Figure 2:
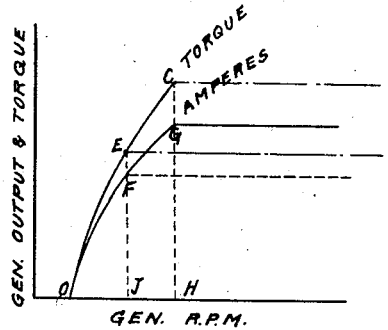
Figs. 2 and 3 are charts showing the operation of the invention.

From the foregoing description of the embodiments thereof, it is apparent that the present invention provides means responsive to generator performance for controlling the excitation of the coupling coil. In the system shown in Fig. 1, the coupling coil is controlled by means responsive to generator current output. In Fig. 2 the excitation of the coupling coil is controlled by current or voltage regulator. In Fig. 3 the excitation of the coupling coil is controlled by generator voltage and temperature. In the present invention, the closing of the ignition control switch 58 prior to starting the engine connects the coupling coil with the battery so that even prior to closing of the cut-out relay contacts 67, 68 the coupling is ready to effect maximum coupling ratio between the engine and the generator whereby the generator voltage attained at low engine speed is sufficient for battery charging.

While the embodiments of the present invention as herein disclosed, constitute preferred forms, it is to be understood that other forms might be adopted, all coming within the scope of the claim which follows.

What is claimed is as follows:

A generator speed-limiting control system for use on automotive vehicles and comprising a generator which is driven at varying speeds by the vehicle propelling engine, said generator having a shunt field winding, a storage battery charged by the generator, a generator-battery circuit including a relay for connecting the generator and battery when the generator is driven at a speed such that its voltage exceeds the countervoltage of the battery and for disconnecting the battery from the generator when the generator speed is at such relatively low value that the battery can discharge through the generator, an electromagnetic coupling normally connecting the engine with the generator at a drive ratio required for the closing of the relay and the charging of the battery at relatively low engine speeds, said coupling having an exciting coil and providing for coupling slip which is least when the energization of the coil is greatest and vice-versa, said coupling coil, when fully exciting, causing the maximum output torque of the coupling to the generator to be equal to the torque required to drive the generator at the maximum speed required for a predetermined full output, a circuit for connecting the coupling coil with the generator-battery circuit between the relay and the battery and including, in series with the coil, two resistances and pairs of contacts respectively normally by-passing these resistances, a thermostat for opening one of the pairs of contacts upon the attainment of a predetermined generator temperature and an electromagnet for opening the other pair of contacts upon the attainment of a predetermined generator voltage whereby the generator speed is reduced to prevent overheating of the generator and whereby the generator speed is reduced either from the higher values permitted before the opening of the thermostat controlled contacts or from the lower values permitted after the opening of the thermostat controlled contacts in order to prevent charging the battery at an excessive rate.

ROBERT M. CRITCHFIELD.
PAUL L. SCHNEIDER.

REFERENCES CITED

The following references are of record in the file of this patent:

UNITED STATES PATENTS

| Number | Name | Date |
|---|---|---|
| 1,124,736 | Heany | Jan. 12, 1915 |
| 1,246,056 | Conrad | Nov. 13, 1917 |
| 1,565,854 | Hasselbring, Jr. | Dec. 15, 1925 |
| 1,861,180 | Grob | May 31, 1932 |
| 2,097,483 | Weydell | Nov. 2, 1937 |

FOREIGN PATENTS

| Number | Country | Date |
|---|---|---|
| 172,664 | Canada | Oct. 24, 1916 |
| 466,978 | France | May 29, 1914 |